United States Patent [19]

Kerber et al.

[11] 4,227,363
[45] Oct. 14, 1980

[54] FLOATING CUTTERBAR HEADER AND HEIGHT CONTROL

[75] Inventors: Dathan R. Kerber, Bettendorf, Iowa; Orlin W. Johnson, East Moline, Ill.; Robert D. Week, Bloomington, Minn.; Richard E. Benson, East Moline, Ill.; John L. VandeWiele; James R. Lucas, both of Moline, Ill.

[73] Assignee: International Harvester Company, Chicago, Ill.

[21] Appl. No.: 939,001

[22] Filed: Sep. 1, 1978

[51] Int. Cl.³ ............................................. A01D 67/00
[52] U.S. Cl. ...................................... 56/10.2; 56/208; 56/DIG. 15
[58] Field of Search ............... 56/10.2, DIG. 15, 10.4, 56/208

[56] References Cited

U.S. PATENT DOCUMENTS

| | | | |
|---|---|---|---|
| 3,163,974 | 1/1965 | Mack | 56/10.2 |
| 3,886,718 | 6/1975 | Talbot | 56/208 |
| 4,091,602 | 5/1978 | Williams et al. | 56/14.4 |
| 4,124,970 | 11/1978 | Bernhardt | 56/10.2 |

Primary Examiner—Jay N. Eskovitz
Attorney, Agent, or Firm—Neal C. Johnson; F. David AuBuchon

[57] ABSTRACT

A crop harvesting header for a self-propelled combine. The header includes a "floating" flexible cutterbar movable vertically relative to the header frame to cut a standing crop (soybeans, for example) close to the ground to minimize crop losses. The cutterbar is connected to a plurality of runner structures pivotally mounted on the header frame. A spring system is operative on the runner structures to resiliently counterbalance the cutterbar. Elongated skids are connected between adjacent pairs of runners to effectively extend along the length of the header. The skids are mounted to permit individual movement of the runners relative to each other as the cutterbar flexes over uneven ground across the harvesting path. The skids are selectively shiftable to vary the cutting height of the cutterbar.

The combine includes a hydraulic system for raising and lowering the header. An automatic system raises and lowers the header in response to sensing the position of the cutterbar relative to the header.

3 Claims, 6 Drawing Figures

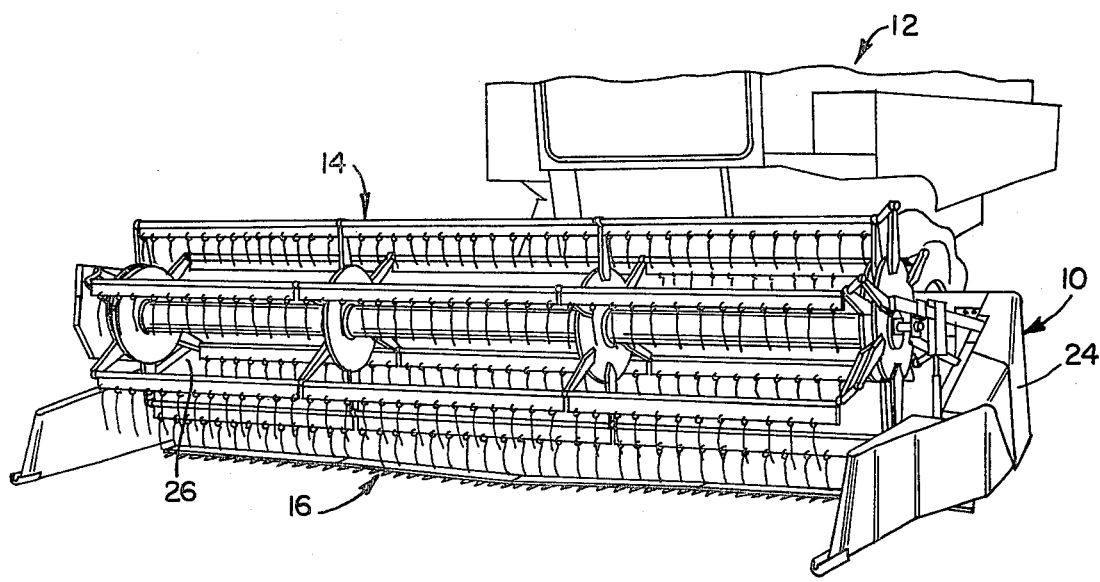
FIG_1_
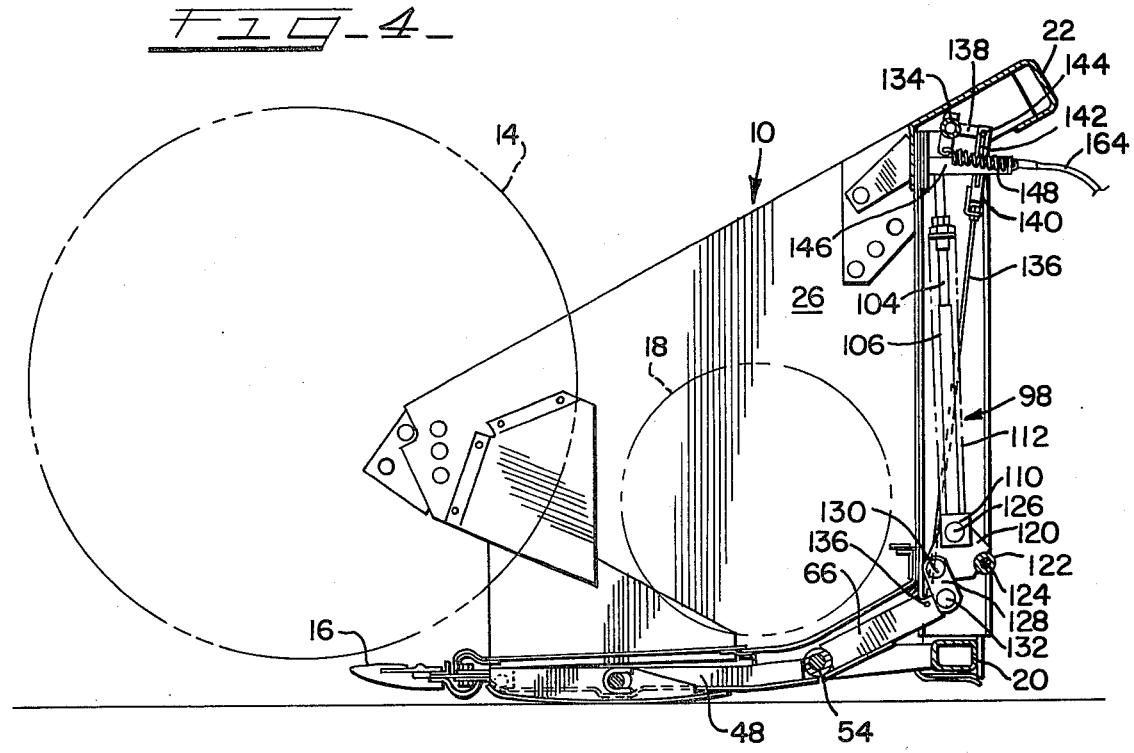
FIG_4_

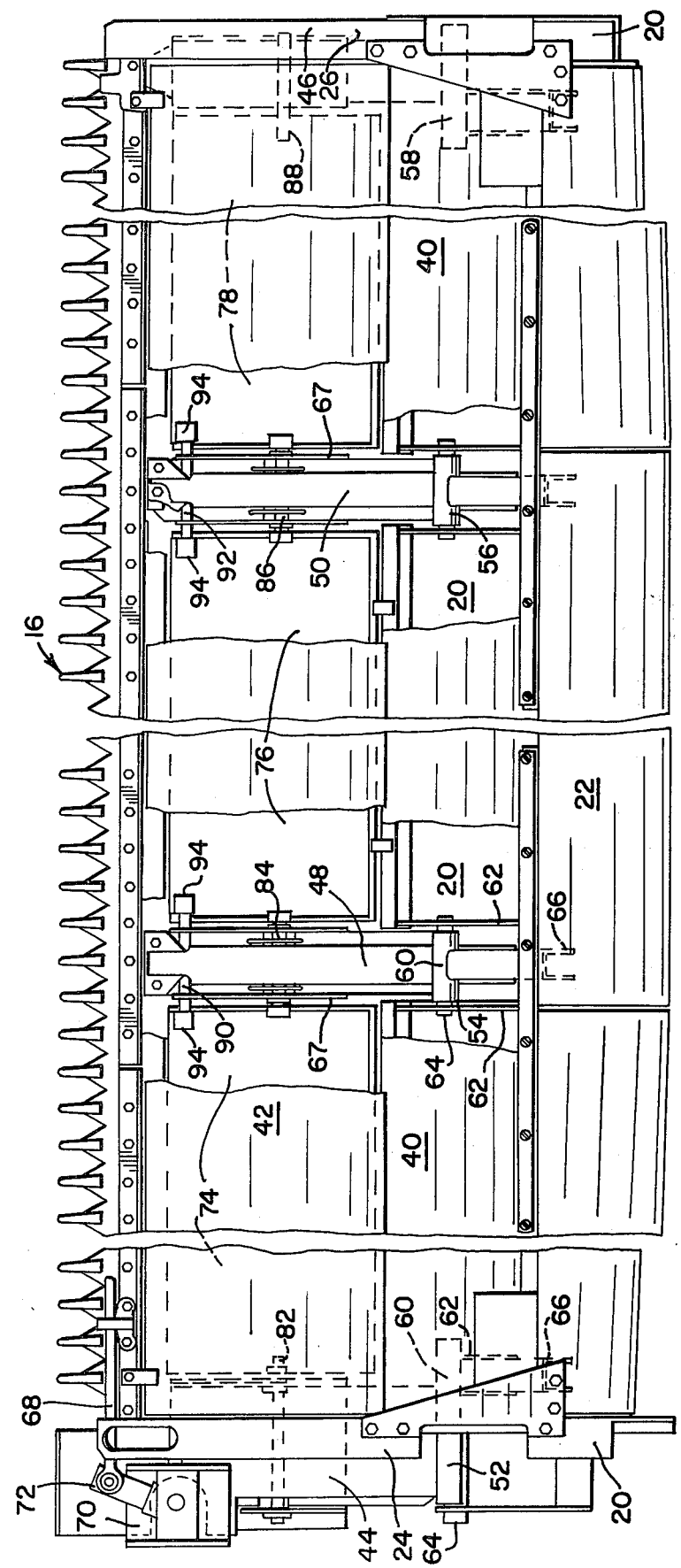

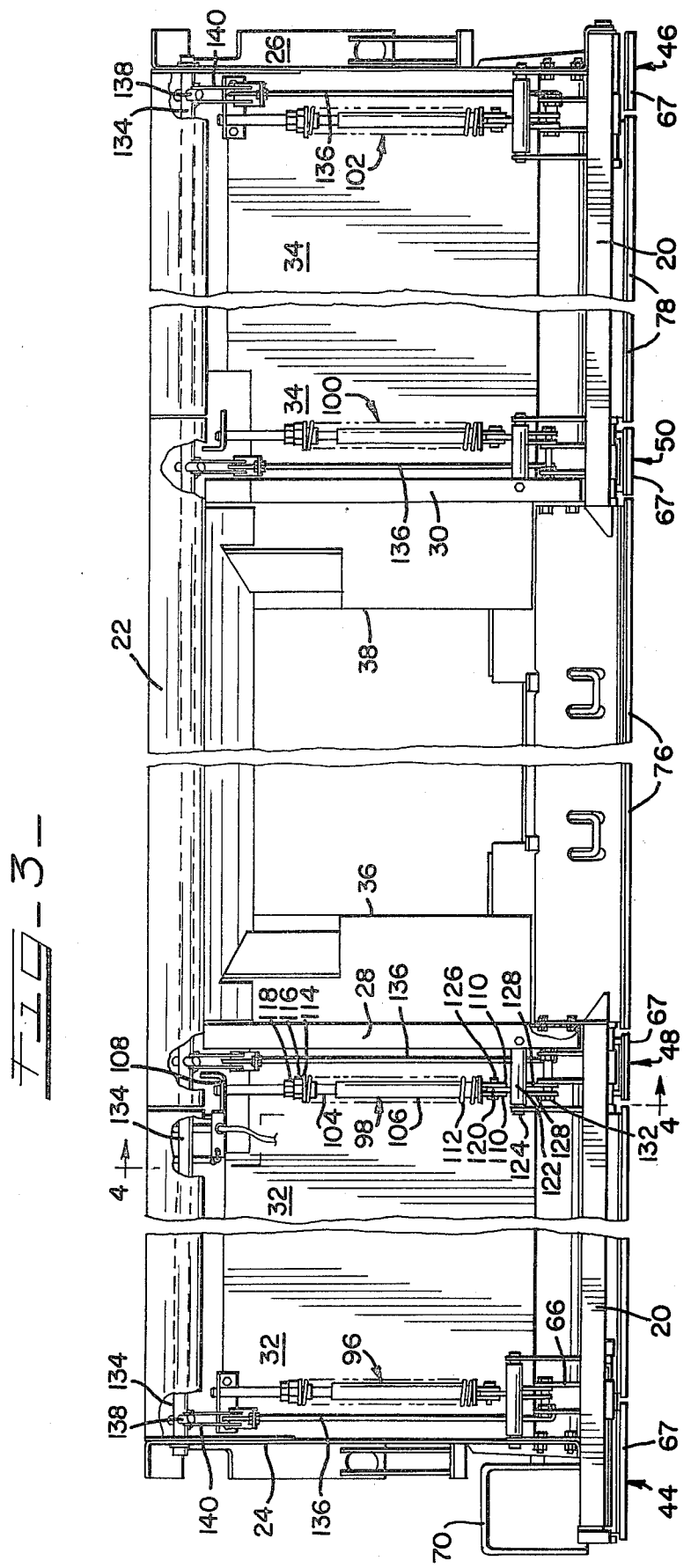
FIG-3-

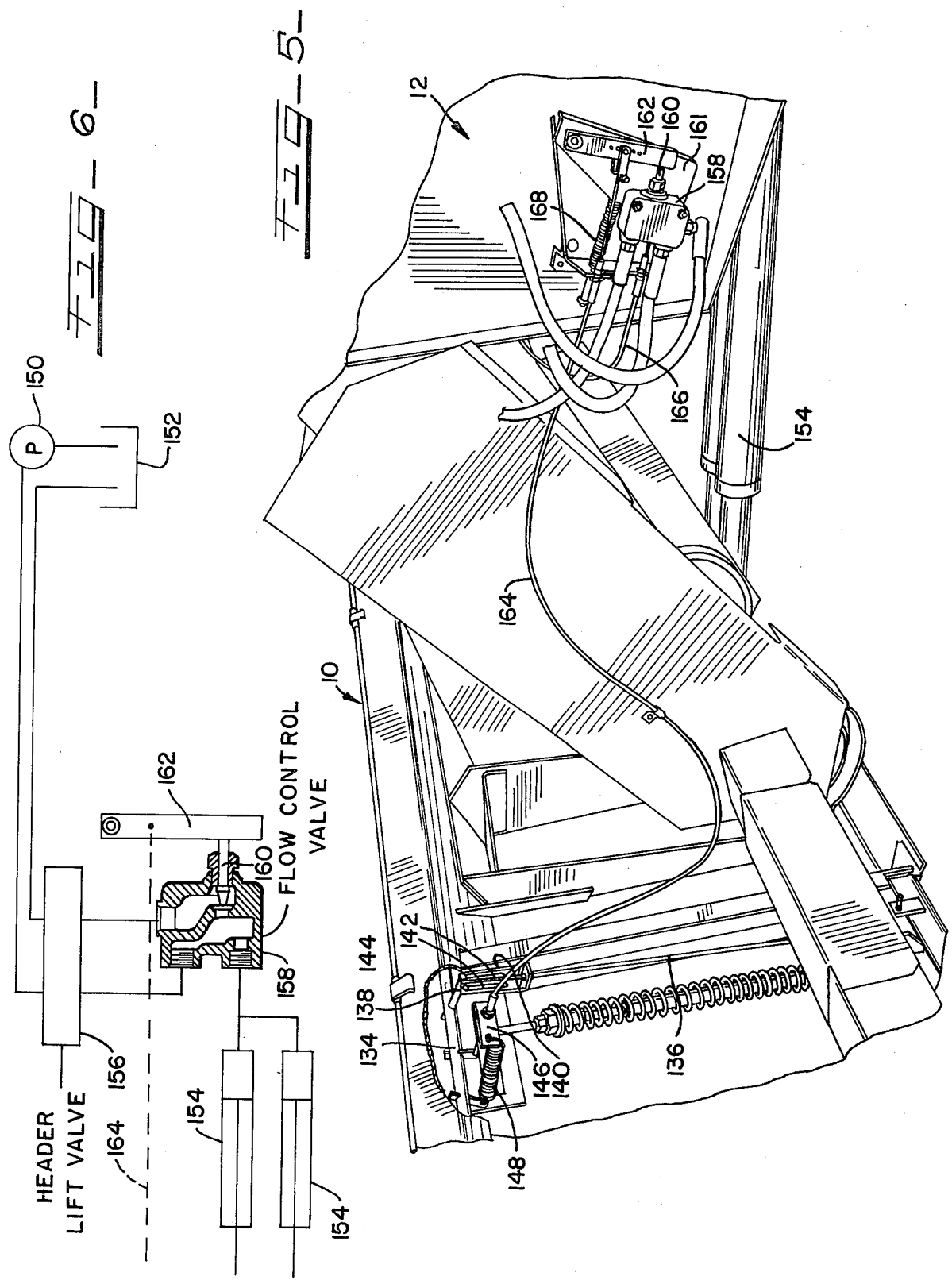

[4,227,363]

FLOATING CUTTERBAR HEADER AND HEIGHT CONTROL

BACKGROUND OF THE INVENTION

1. Field of the Invention:

The invention relates generally to floating cutterbar type headers and more particularly to such a header with an automatic header height control system.

2. Prior Art:

Several examples of automatic header height control systems for floating cutterbar type headers are shown in U.S. Pat. Nos. 3,886,718 Talbot, 3,698,164 Boone, 3,597,907 Neal, and 2,913,865 Carruthers. The Talbot and Boone patents include feeler members 55 and 36 respectively movable in response to shifting of the cutterbar relative to the header. Each patent shows an electrical system for transmitting raise or lower signals from the feelers to the control valve of the header lift system. The Neal patent senses pressure changes in the header lift system and transmits electrical signals to a control valve for raising and lowering the header. The Carruthers patent shows a mechanical system from a cutterbar for shifting a control valve between raise and lower positions to thus move the header. The systems having electrical components raise considerations of ease of field service and adjustment. Moreover, all the illustrated systems appear to move the header up or down at fixed rates—a sort of "on-off" response to sensing ground level variations. While variable rate systems are known in the art (assignee's combine Models 815 and 915, none are known to exist in a floating cutterbar type header wherein feelers or the like have been eliminated.

Practical considerations for automatic header height control systems are reliability in operation and maintaining the cutterbar in cose cutting relation to the ground to minimize gathering losses while concurrently preventing damage to the cutterbar and header.

SUMMARY

The invention provides an improved floating cutterbar type header and an automatic header height control system therefor. The cutterbar moves up and down relative to the header and also flexes to maintain conformance to the ground along and across the harvesting path. When the ground level varies a simple and effective mechanical linkage is actuated in response to cutterbar movement. The header includes a hydraulic system for raising and lowering the header relative to the harvesting machine. The linkage is operatively connected to the hydraulic system for actuating header movement as sensed from cutterbar movement. In a preferred embodiment the position of the cutterbar is sensed at a plurality of points along its length. The use of "feeler" members of the prior art has been entirely eliminated. The operating linkage of the invention is disposed on the header out of interference with the ground or the crop and is readily accessible for service or adjustment. The hydraulic system is operatively connected to the cutterbar such that a variable rate of movement of the cutterbar is transmitted into a variable rate of movement of the header. A practical result is that the greater the height of an obstruction over which the cutterbar rises, the faster will be the lifting time of the header. This contrasts with "on-off" systems in which the header moves at a fixed rate regardless of the height of an obstruction or the depth of a ground depression encountered by the cutterbar.

The principal object of the invention is to provide an improved floating cutterbar header having an automatic header height control system which maintains the cutterbar in close relation to the ground to minimize crop cutting losses. The control system provides fast header movement response to changing ground profile.

BRIEF DESCRIPTION OF THE DRAWINGS

FIG. 1 is a fragmentary perspective view of a crop harvesting header mounted on a self-propelled combine;

FIG. 2 is a plan view of the header of FIG. 1;

FIG. 3 is a rear elevational view of the header;

FIG. 4 is a sectional view of the header taken along lines 4—4 of FIG. 3;

FIG. 5 is an enlarged fragmentary perspective view of a portion of the automatic header height control system for a floating cutterbar type header; and FIG. 6 is a schematic view of the header lift system.

DESCRIPTION OF THE PREFERRED EMBODIMENT

Referring first to FIG. 1 there is shown a header 10 mounted by conventional means on a self-propelled combine 12. The header 10 includes a conventional reel 14 for engaging a standing crop and moving it rearwardly for cutting by a cutterbar shown generally at 16 extending the length of the header. An auger 18 (shown schematically in FIG. 4) consolidates the cut crop centrally on the header from which the crop is moved rearwardly by conventional means into the combine.

As best shown in FIGS. 2 through 4 the header 10 has the basic structural framework including a lower beam assembly 20, an upper beam assembly 22, opposite end walls 24 and 26, and vertical channels 28 and 30 (FIG. 3) extending between the upper and lower beam assemblies. Sheet structures 32 and 34 are disposed vertically along the rear of the header from the respective end walls 24 and 26 inwardly and terminate at respective edges 36 and 38 which together with the upper and lower beams define the feed outlet opening to the combine. A fixed bottom sheet 40 extends between the end walls 24 and 26 beneath the auger 18 and together with the back sheets 32 and 34 provide a so-called "wrap" for the crop conveying auger 18. A movable sheet 42 is pivotally connected to the forward edge of the sheet 40 and is slidably connected along its forward edge to the cutterbar 16. In practice the sheet 42 may consist of several longitudinally overlapping sections to facilitate vertical flexure of the cutterbar along its length.

The cutterbar 16 is supported on the header 10 by a pair of end runners 44 and 46 and a pair of internal runners 48 and 50 all connected at their forward ends to the cutterbar. Each of the runners 44, 48, 50 and 46 is pivotally connected to the header by pivot structures shown at 52, 54, 56, and 58 respectively in FIG. 2. Each pivot structure includes a cylindrical bushing 60 welded to the respective runner, a pair of plates 62 welded to the lower beam assembly 20, and a pin 64 mounted through the plates 62 and the bushing 60. It will of course be understood that the pivot connections are coaxially aligned and permit the cutterbar 16 to move up and down relative to the header. As best shown in FIGS. 2 and 4 the pivot connections are disposed intermediate the ends of the runners thus defining a rearward end 66 of each runner projecting rearwardly of the back wall 32 and 34 of the header and above the lower beam assembly 20. In practice, an additional runner (not shown) may be connected to the cutterbar midway between the intermediate runners 48 and 50 to provide additional support. Further, each runner is preferably equipped with a ground-engaging shoe shown at 67 in FIGS. 2 and 3 and thus reference to "runner" herein includes such ground-engaging structure.

The cutterbar 16 is itself of the usual type having a reciprocating knife 68 driven by a wobble drive unit 70. The drive unit 70 has a rotary input drive (not shown) and an oscillating output drive arm 72 connected to the knife 68. The unit 70 is mounted on the end runner 44 outside of the wall structure 24 of the header. The cutterbar 16 is vertically flexible along its length so as to maintain a close cutting relation to the ground despite ground level variations across the harvesting path of the header.

As shown in the plan view of FIG. 2 an elongated skid 74 is disposed between the runners 44 and 48, another skid 76 is disposed between the runners 48 and 50, and another skid 78 is disposed between the runners 50 and the end runner 46. As mentioned above the header in practice may include a center runner (not shown) between the runners 48 and 50 in which case the header would include two skids (one on each side of the center runner) instead of the single skid 76. The skids 74, 76, and 78 are connected to and supported on the adjacent runners so as to be movable vertically with the cutterbar 16. The skids are disposed in alignment along substantially the entire length of the header and provide the basic ground engagement and support for the floating cutterbar. The skids have a curved bottom sheet 80 providing slidable ground support.

As best shown in FIG. 2 the skids are connected to the adjacent runner structures by means including crank pins 82, 84, 86 and 88 journalled in the respective runners 44, 48, 50 and 46. In addition, the forward portions of the skids have a lost-motion connection with a pair of pins 90 and 92 fixed on the forward ends of the runners 48 and 50 respectively, there being a similar pin on each of the other runners as well. As shown in FIG. 2 each pin 90 and 92 projects through the respective runner to extend into a box structure 94 on each of the adjacent ends of the adjacent skids. The box structure 94 has a vertical dimension greater than the diameter of the pin 90 permitting the skid 76 to pivot in use about the aligned crank pins 84 and 86 within the limits provided by the engagement of the box structure 94 with the fixed pin 90. It will be understood that the other pin 92 has the same lost-motion connection with the adjacent skid ends. Accordingly, the skids can pivot somewhat about the crank pins to maximize ground support as ground level varies.

The crank pins as illustrated by the pins 82 and 84 have ends which are offset from the main body of the pin and project into the adjacent skids. Rotation of the crank pins 180° will shift the skids relative to the runners about the pins 90 and 92 between raised and lowered positions. In a practical embodiment the skids can be set in the raised position to provide a nominal cutting height of 1.5 inches (40 mm) or shifted by the crank pins to the lower position to provide a nominal cutting height of 2.2 inches (56 mm). The higher cutting position is useful for soft ground or rocky conditions. In practice, each of the runner-mounted ground-engaging shoes 67 is pivotally mounted on the respective runner for shifting movement with the above described skids.

The shoes 67 preferably have a ground-engaging configuration similar to that of the skids.

Means are provided for counterbalancing the cutterbar so that the skids and shoes will engage the ground with a substantially constant pressure as the cutterbar moves up and down with ground level variations. As shown generally in FIG. 3 a plurality of counterbalancing assemblies are shown at 96, 98, 100, and 102 disposed adjacent to the rear wall structure of the header and operatively associated with the runners 44, 48, 50 and 46 respectively. Each of the counterbalancing assemblies is essentially the same in construction and hence only the assembly 98 shown in FIGS. 3 and 4 will be described in detail.

An elongated rod 104 is telescopically received in a tube 106. The upper end of the rod 104 is threaded and is retained in a bracket 108 fastened to the rear wall structure of the header. The lower end of the tube 106 is welded to a pair of spaced ears 110 (FIG. 3). An elongated coil spring 112 is disposed about the tube 106 and rod 104 in engagement at its lower end with the ears 110 and at its upper end with a washer 114 on the threaded portion of the rod 104. The washer 114 is retained against an adjustment nut 116 which is in turn backed by a lock nut 118.

Each of the counterbalancing assemblies further includes a plate or arm 120 having a transverse integral sleeve 122 journalled on a pin 124 extending through the plates 62 of the header frame. The plate 120 is received between the ears 110 and is pivotally connected thereto by a pin 126. A pair of parallel bar links 128 is pivotally connected between the plate 120 and the runner end 66 by pins 130 and 132.

In operation, the ground pressure of the cutterbar can be preselected by adjusting the force of the spring 112 of each counterbalancing assembly. This is accomplished by turning the adjustment nut 116 up or down on the rod 104 to vary the length of the compressed spring. The lock nut 118 retains the adjustment nut 116 in the desired position. A practical example of preselecting ground pressure for given field and crop conditions would be for stiff stubble conditions requiring heavy contact pressure to crush the stubble to achieve a low cutting height.

As will be seen with reference to FIG. 4 the cutterbar 16 is floatably supported at each runner by the respective coil spring 112 exerting a downward force on the plate 120 tending to pivot it downwardly about the pivot pin 124. The force is transmitted through the pair of links 128 to the runner end 66. This tends to lift the cutterbar about the pivot connection 54 of the runner to the header. It will be seen that the force of spring 112 will shift to the left away from the pin 124. Accordingly, the moment arm of the spring force increases even as the force of the spring itself decreases through expansion of the spring. The orientation of the links 128 is such that there is minimal change in the moment arm about the pivot connection 54 of the runner. Thus, the change in the moment arm between the spring force and the pivot pin 124 remains the principal factor in maintaining a substantially constant counterbalancing force as the force of the spring 112 varies. In actual practice the counterbalancing force is not exactly constant but is definitely much less variable than the spring force.

In accordance with a feature of the invention, the header includes a system for automatically raising or lowering the header in response to movement of the cutterbar over uneven ground to maintain the cutterbar in close cutting relation with the ground. As shown in the overall view of FIG. 3, an elongated rockshaft 134 is journalled on the rear wall structure of the header and extends essentially the full length thereof. Rods 136 are pivotally connected to the end 66 of each of the runners 44, 46, 48 and 50 and extend upwardly into connection with respective arms 138 rigidly secured to the rockshaft 134 at spaced points therealong above the respective runners. Each rod 136 terminates at its upper end in a U-shaped strap 140 having slots 142 defined therein for receiving a pin 144 secured to the respective arm 138. By this arrangement the rod 136 can shift a limited extent without imparting rotation to the rockshaft 134. As shown in FIGS. 4 and 5 a bracket 146 is secured to the rear wall structure of the header. A coil spring 148 is connected between the bracket 146 and the rockshaft 134 tending to rotate the rockshaft in the counterclockwise direction as shown in FIG. 4.

As mentioned at the outset the header 10 is mounted on the combine 12 in conventional manner. The combine includes a conventional hydraulic system for raising and lowering the header. As shown schematically in FIG. 6 this system includes a pump 150 drawing pressure fluid from a sump 152 for pressurizing lift cylinders 154 connected between the combine and the header. The system includes a header lift valve 156 by which the operator selectively controls raising and lowering of the header. A standard flow control valve 158 is connected between the cylinders 154 and lift valve 156 and through which pressure fluid is available to the cylinders when the valve 156 is set in a position permitting flow therethrough. The valve 158 includes a metering pin 160 which, when moved to the left (FIG. 6) causes pressure fluid to flow into the cylinders 154 to lift the header.

In practice, as shown in FIG. 5, the valve 158 is mounted on a plate 161 pivotally mounted on the side of the combine. A lever 162 is pivotally mounted on the combine so as to be suspended in contact with the metering pin 160 of the valve. A cable 164 is connected between the lever 162 and the rockshaft 134 for shifting the pin 160 in response to rotation of the rockshaft. In practice, the valve 158 is mounted on the pivotable plate 161 so as to be positionable from the cab by a cable 166 to preselect the header height relative to the cutterbar. A spring 168 acts on the plate 161 to maintain the valve in proper position relative to the control lever 162.

In operation, the header height control system functions to automatically raise and lower the header relative to the combine in response to sensing the position of the cutterbar at points along the cutterbar length. Due to the unique relationship of cutterbar, runners, linkages, rockshaft, and control valve, it will be seen that the specific runner connected to the cutterbar at or near the highest point along the cutterbar length will be the runner which actuates the valve 158 to raise or lower the header. For example, assuming that the ground in front of the cutterbar at or near the runner 48 includes a raised portion, the cutterbar supporting skids will ride up over the raised portion and the end 66 of the runner 48 will move downwardly about pivot 54 (FIG. 4). The rod 136 is thus pulled down and the rockshaft 134 is rotated clockwise. This pulls the cable 164 and the attached lever 162 (FIGS. 5 and 6) moves the metering pin 160 further into the valve 158. This increases the fluid pressure in the cylinders 154 which extend to lift the header. As the header is moving upwardly, the cutterbar will be moving downwardly relative thereto. The runner end 66 will thus shift upwardly and the spring 148 (FIGS. 4 and 5) will turn the rockshaft 134 counterclockwise. This will release the tension on the cable 164 permitting the fluid pressure within the valve 158 to move the metering pin 160 to the right (FIGS. 5 and 6). This decreases the pressure in the cylinders 154 and the header stops lifting.

Lowering of the header occurs when the runner which is the highest relative to the others moves downwardly over a ground depression. This shifts the respective rod 136 upwardly permitting the spring 148 (FIG. 4) to rotate the rockshaft 134 in the counterclockwise direction. (The highest runner is controlling since the rods 136 of the other lower runners will be within the lost motion connections of the pins 144 in the slots 142.) The counterclockwise rotation of the rockshaft 134 reduces tension on the cable 164 permitting fluid pressure in the valve 158 to move the metering pin 160 to the right (FIG. 6). This decreases the pressure in the cylinders 154 to the point where the weight of the header causes it to move downwardly. The header stops when the runner end 66 shifts downwardly to rotate the rockshaft 134 in a clockwise direction.

It should be seen that the above described header lifting or lowering does not occur at a fixed rate but rather at a rate which is variable in accordance with the rate of movement of the cutterbar. In short, the higher or lower the ground obstruction or depression, the faster the header is moved to enable the cutterbar to rise over the obstruction or move downwardly in the depression. This variable rate of response contributes to the desired result of maintaining the cutterbar in close-cutting relation to undulating or uneven ground along and across the harvesting path. It will be seen that the counterbalancing assemblies 96, 98, 100, and 102 contribute significantly to this result by resiliently supporting the cutterbar throughout its range of movement. It will also be seen that the disposition of the actuating linkages behind the header rear wall together with the simplicity of the design contribute to reliability in field operation.

By the foregoing Applicants have provided an improved floating cutterbar type header and an automatic header height control system therefor. The invention results in a reduction of crop losses.

What is claimed is:

1. A harvesting header for a mobile harvesting machine comprising:
 a header frame adapted for mounting on the harvesting machine for powered movement vertically relative to the machine;
 a cutterbar floatably mounted on the header frame for ground-induced movement relative thereto as ground level varies during harvesting;
 means for applying a counterbalancing force on the cutterbar to floatably support the cutterbar;
 and means for raising and lowering said header frame in response to sensing the vertical position of said cutterbar, said means including:
 (a) a member connected to the cutterbar for movement therewith and having an end disposed proximate to the rear of the header frame.
 (b) a rockshaft mounted on the header frame,
 (c) a link connected between said end of said member and said rockshaft for translating vertical movement of the cutterbar into rotational movement of the rockshaft, (d) a hydraulic system for raising and lowering the header frame, (e) and a cable connected between said rockshaft and said system for actuating the system in response to rotation of the rockshaft to raise or lower the header frame, said hydraulic system including means for varying the rate of header movement in response to variable rate of ground-induced movement of the cutterbar, whereby the header will lift progressively faster as the cutterbar moves progressively higher over a rise in the ground.

2. A harvesting header for a mobile harvesting machine comprising:

a header frame adapted for mounting on the harvesting machine for powered movement vertically relative to the machine;

a floating cutterbar for cutting a standing crop;

means mounting the cutterbar on the header frame for vertical movement relative thereto to accommodate variable ground profile, said means including a plurality of fore-and-aft extending transversely spaced runners connected at their forward ends to said cutterbar and pivotally connected intermediate their ends to said header frame whereby the rearward ends move up and down oppositely to said cutterbar;

means for applying a counterbalancing force on the rearward ends of said runners to floatably support said cutterbar;

and means for raising or lowering said header frame in response to sensing the vertical position of said cutterbar, said means including:

(a) a rockshaft mounted on the header frame, (b) a linkage connected between each of said rearward ends of said runners and said rockshaft for translating vertical movement of said cutterbar into rotational movement of said rockshaft, (c) a hydraulic system including lift cylinders for raising and lowering the header frame, (d) and a cable connected between the rockshaft and said hydraulic system for actuating the system in response to vertical movement of the cutterbar, said hydraulic system including control means operable by said cable for varying the rate of header movement in response to variable rate of cutterbar movement, whereby the header will lift progressively faster as the cutterbar moves progressively higher over a rise in the ground.

3. A harvesting header for a mobile harvesting machine comprising:

a header frame adapted for mounting on the harvesting machine for powered movement vertically relative to the machine;

a floating cutterbar for cutting a standing crop;

means mounting the cutterbar on the header frame for vertical movement relative thereto to accommodate variable ground profile, said means including a plurality of fore-and-aft extending transversely spaced runners connected at their forward ends to said cutterbar and pivotally connected intermediate their ends to said header frame whereby the rearward ends move up and down oppositely to said cutterbar;

means for applying a counterbalancing force on the rearward ends of said runners to floatably support said cutterbar;

and means for raising or lowering said header frame in response to sensing the vertical position of said cutterbar, said means including:

(a) a rockshaft mounted on the header frame, (b) a linkage connected between each of said rearward ends of said runners and said rockshaft for translating vertical movement of said cutterbar into rotational movement of said rockshaft, (c) a hydraulic system including lift cylinders for raising and lowering the header frame, (d) and a cable connected between the rockshaft and said hydraulic system for actuating the system in response to vertical movement of the cutterbar, said header frame including a generally vertical rear wall, said rearward ends of said runners projecting rearwardly sufficiently to be accessible at said rear wall, said rockshaft being journalled on said rear wall above the rearward runner ends and extending along the length of the header frame, each of said linkages including a rod connected to the respective runner rearward ends and extending upwardly into pivotal connection with said rockshaft, whereby downward movement of one of the rearward runner ends pulls the rod downwardly to cause rotation of the rockshaft and actuation of header lift.

* * * * *